(12) United States Patent
Bireley et al.

(10) Patent No.: US 8,402,436 B2
(45) Date of Patent: Mar. 19, 2013

(54) COOPERATIVE UNWRAPPING ACROSS INTERVENING WRAPPERS

(75) Inventors: William R. Bireley, Morgan Hill, CA (US); Delmar E. Blevins, Los Gatos, CA (US); Stephen A. Brodsky, Los Gatos, CA (US); Jaijeet Chakravorty, Union City, CA (US); Anshul Dawra, San Jose, CA (US); Suavi A. Demir, San Jose, CA (US); Swaminathan Gounder, San Jose, CA (US); Paul Ostler, Yakima, WA (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 12/258,849

(22) Filed: Oct. 27, 2008

(65) Prior Publication Data

US 2010/0107139 A1    Apr. 29, 2010

(51) Int. Cl.
*G06F 9/44* (2006.01)

(52) U.S. Cl. .......... 717/120; 717/117; 717/121

(58) Field of Classification Search .......... None
See application file for complete search history.

(56) References Cited

U.S. PATENT DOCUMENTS

| | | | | |
|---|---|---|---|---|
| 6,854,107 B2* | 2/2005 | Green et al. | ............ | 717/117 |
| 7,519,948 B1* | 4/2009 | Cornish | ............ | 717/117 |
| 7,721,259 B2* | 5/2010 | Heinke et al. | ............ | 717/121 |
| 7,802,238 B2* | 9/2010 | Clinton | ............ | 717/136 |
| 7,805,533 B2* | 9/2010 | Burns et al. | ............ | 709/230 |
| 7,827,559 B1* | 11/2010 | Rhee et al. | ............ | 718/104 |
| 8,239,830 B2* | 8/2012 | Ionfrida et al. | ............ | 717/121 |
| 2004/0181779 A1* | 9/2004 | Gorti | ............ | 717/120 |
| 2004/0255272 A1* | 12/2004 | Ondrusek et al. | ............ | 717/120 |
| 2007/0168962 A1* | 7/2007 | Heinke et al. | ............ | 717/120 |
| 2008/0127086 A1* | 5/2008 | Sattler et al. | ............ | 717/121 |
| 2009/0300199 A1* | 12/2009 | Burns et al. | ............ | 709/230 |

OTHER PUBLICATIONS

Shneiderman, Ben. Promoting Universal Usability With Multi-layer Interface Design, Proceedings of the 2003 conference on Universal usability, 2003, pp. 1-8, Retrieved on [Nov. 8, 2012] Retrieved from the Internet: URL<http://dl.acm.org/citation.cfm?id=957206>.*
Blumenthal et al.Wireless Sensor Networks—New Challenges in Software Engineering, IEEE Conference Emerging Technologies and Factory Automation, 2003, pp. 551-556, Retrieved on [Nov. 8, 2012] Retrieved from the Internet: URL<http://ieeexplore.ieee.org/stamp/stamp.jsp?tp=&arnumber=1247755>.*

* cited by examiner

*Primary Examiner* — Thuy Dao
*Assistant Examiner* — Cheneca Smith
(74) *Attorney, Agent, or Firm* — Cantor Colburn LLP; Susan Murray

(57) ABSTRACT

A method of accessing layers in a multi-layer software architecture including a first layer, a second layer, and a third layer. The method includes: at the third layer, publishing an interface; and at the first layer, before execution of a first function, registering a callback routine with the third layer using the interface.

7 Claims, 4 Drawing Sheets

COOPERATIVE UNWRAPPING ACROSS INTERVENING WRAPPERS

BACKGROUND

This invention relates to methods, systems, and computer program products for communicating information between layers in a multi-layer software architecture.

Software architectures can include various layers. For example, a software architecture can include an application layer, an application server layer, and a database driver layer. Such layers can be implemented by different vendors. In some instances, the layers are implemented in a hierarchical fashion. The first layer communicates with the second layer and the second layer communicates with the third layer. Typically, the first and the third layer do not communicate.

When the third layer adds new functionality, the functionality does not immediately become available to the first layer. Vendors of the second layer need to implement an interface for the new functionality to make the functionality visible to the first layer. When making the functionality available to the first layer, the second layer adds additional value by adding other services. Thus, in most cases, the first layer does not want to directly use the third layer, rather the first layer prefers to go through the second layer to benefit from these services. However, the trade-off is that the first layer loses access to the additional functionality provided by the third layer when access to the functionality is not provided by the second layer.

SUMMARY

Accordingly, a method of accessing layers in a multi-layer software architecture including a first layer, a second layer, and a third layer. The method includes: at the third layer, publishing an interface; and at the first layer, before execution of a first function, registering a callback routine with the third layer using the interface.

Additional features and advantages are realized through the techniques of the present disclosure. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The drawings described herein are for illustration purpose only and are not intended to limit the scope of the present disclosure in any way. It should be understood that throughout the drawings, corresponding reference numerals indicate like or corresponding parts and features.

DETAILED DESCRIPTION

Figure 1:
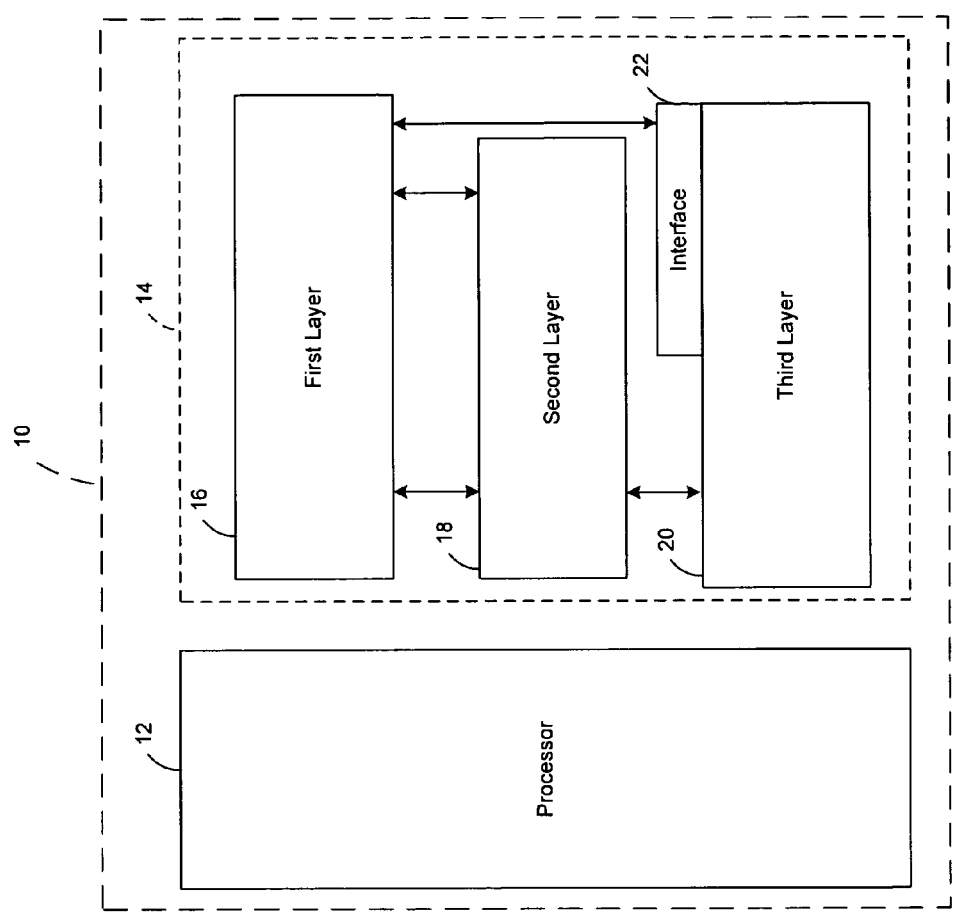
FIG. 1 is a functional block diagram illustrating a multi-layer software architecture system in accordance with an exemplary embodiment.

Turning now to the drawings in greater detail, it will be seen that in FIG. 1 a computing system 10 is shown to include a software architecture of the present disclosure. The computing system 10 includes a processor 12 and memory 14. The processor 12 executes instructions. The instructions may include one or more separate programs, each of which comprises an ordered listing of executable instructions for implementing logical functions. The memory 14 stores the instructions of software applications according to the software architecture of the present disclosure.

In various embodiments, the software architecture includes three or more software layers. As can be appreciated, the methods, systems, and computer program products of the present disclosure can be similarly applicable to communications between various layers in a multi-layer environment including more than just three layers. For ease of the discussion, the remainder of the disclosure will be discussed in the context of a three-layer software architecture.

As shown in FIG. 1, a first layer 16 includes one or more software applications that interface with a second layer 18. The second layer 18 includes one or more software applications that interface with the first layer 16 and a third layer 20. The third layer 20 includes one or more software applications that interface with the second layer 18. In various embodiments, third layer 20 includes a published interface 22 that can be used by the first layer 16 to communicate with the third layer.

Figure 2:
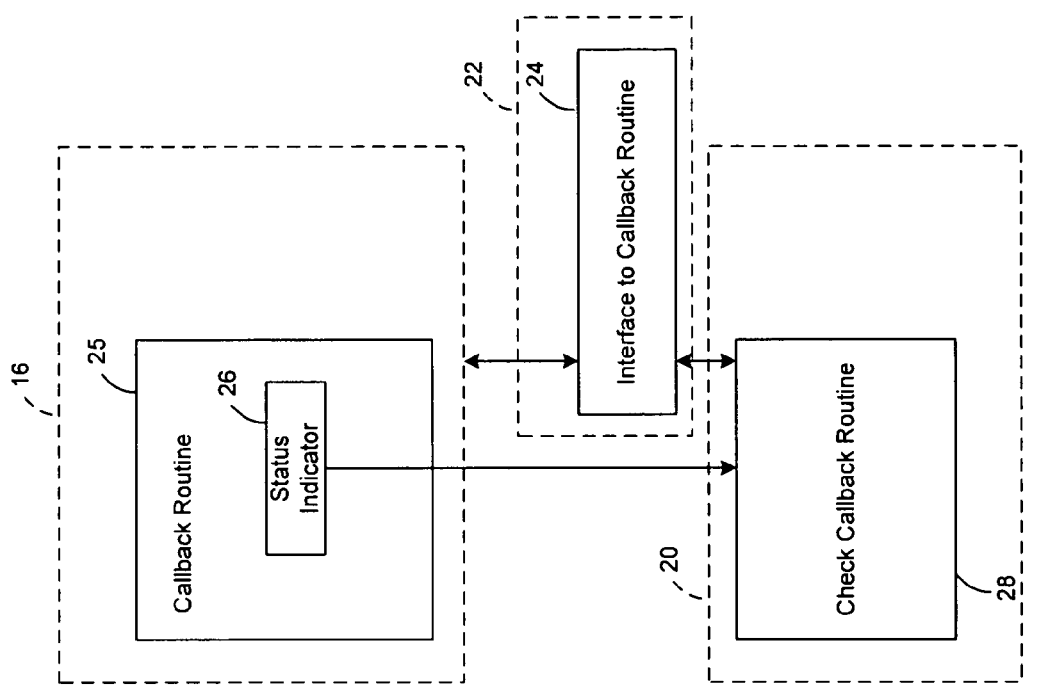
FIG. 2 is a functional block diagram illustrating an interface, a first layer, and a third layer of the software architecture system in accordance with an exemplary embodiment.

Referring now to FIG. 2, the interface 22, the first layer 16, and the third layer 20 are shown in more detail in accordance with an exemplary embodiment. The interface 22 includes a callback routine interface 24. The callback routine interface 24 is used by the first layer 16 to register a callback routine 25 of the first layer 16 with the third layer 20. The callback routine 25 optionally includes a status indicator 26. The status indicator 26 sets a communication context for a subsequent invocation of a function provided by the second layer 18 (FIG. 1) and the third layer 20. In various embodiments, the status indicator 26 can be implemented as, but is not limited to, a global variable at a memory address that is agreed upon by the first layer and the second layer, a thread local variable or event handler, an instance variable, in shared memory, a mutex, a common file, and a socket. A check callback routine 28 of the third layer 20 evaluates the registration of the callback routine 25 and optionally the status indicator 26 and executes one or more functions of the third layer 20 accordingly.

Figure 3:
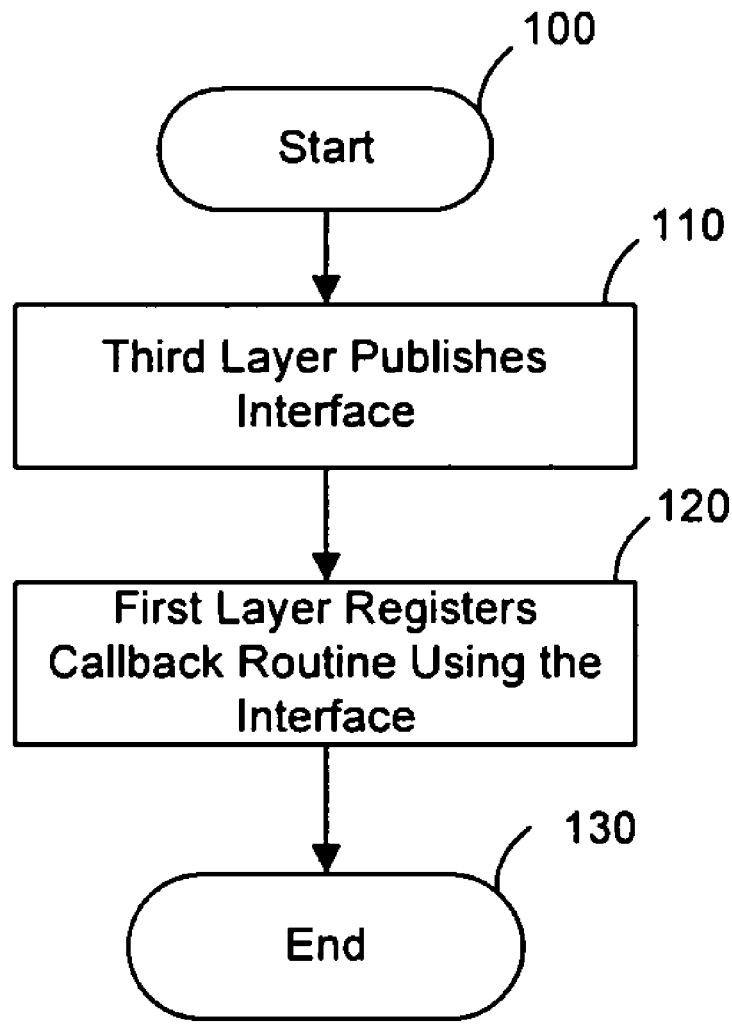
FIG. 3 is a flowchart illustrating a registration method of the software architecture system in accordance with an exemplary embodiment.

Referring now to FIG. 3 and with continued reference to FIGS. 1 and 2, a registration method as performed by the multi-layer software architecture of the present disclosure is shown in more detail in accordance with an exemplary embodiment. As can be appreciated in light of the disclosure, the order of operation within the method is not limited to the sequential execution as illustrated in FIG. 3, but may be performed in one or more varying orders as applicable and in accordance with the present disclosure. As can be appreciated, one or more steps of the methods can be added or removed without altering the spirit of the method.

In one example, the method may begin at 100. The third layer 20 publishes the interface 22 at process block 110. The first layer registers the callback routine with the third layer using the interface 22 at process block 120. Thereafter, the method may end at process block 130

Figure 4:
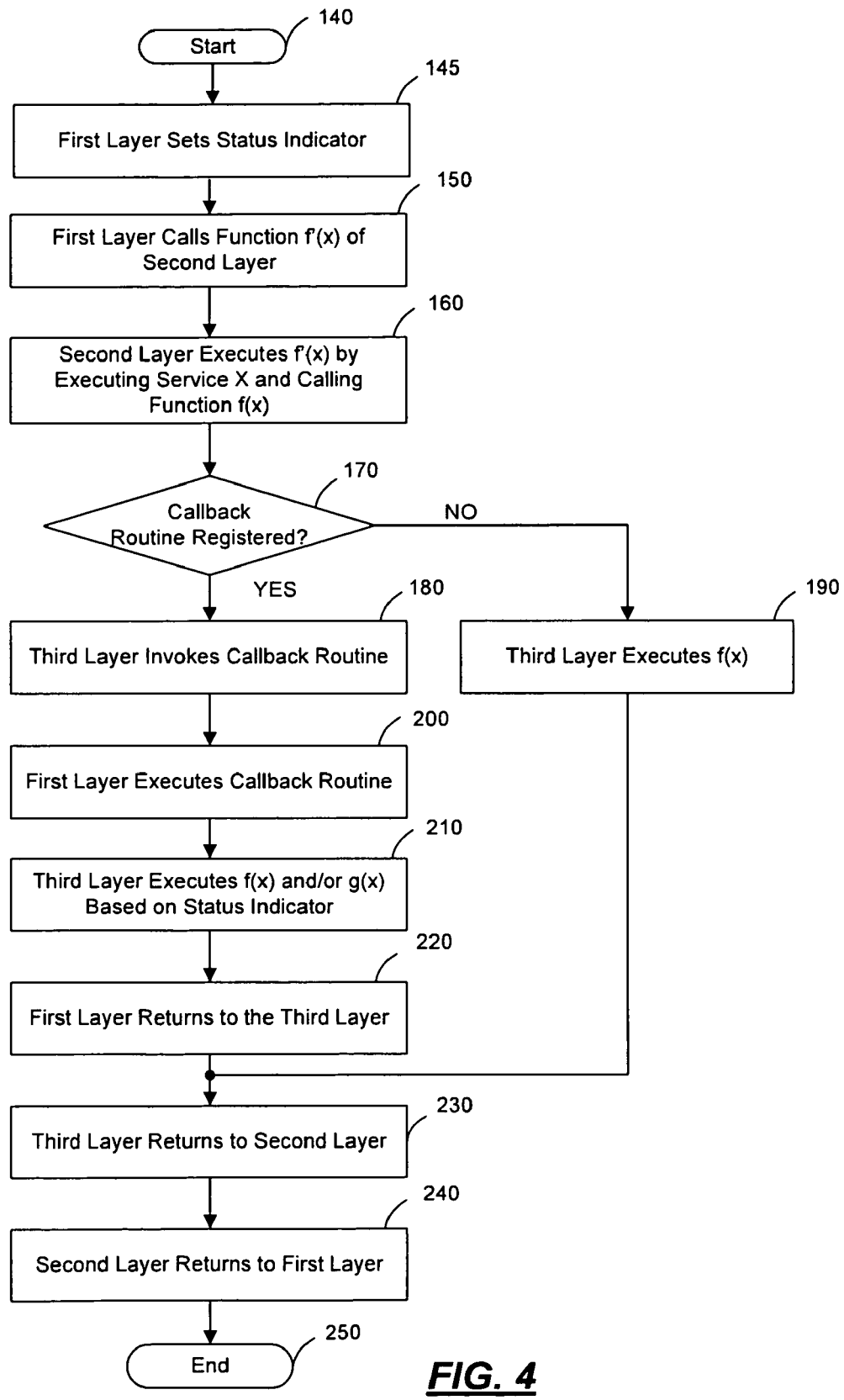
FIG. 4 is a flowchart illustrating a communication method of the software architecture system in accordance with an exemplary embodiment.

Referring now to FIG. 4 and with continued reference to FIGS. 1 and 2, a communication method as performed by the multi-layer software architecture of the present disclosure is shown in more detail in accordance with an exemplary embodiment. As can be appreciated in light of the disclosure, the order of operation within the method is not limited to the sequential execution as illustrated in FIG. 4, but may be performed in one or more varying orders as applicable and in accordance with the present disclosure. As can be appreciated, one or more steps of the methods can be added or removed without altering the spirit of the method.

In one example, the third layer 20 makes function f(x) and function g(x) available to the second layer 18 and the second layer 18 makes available f(x) to the first layer 16 as f'(x) but does not make available g(x).

In this example, the method may begin at process block 140. The first layer 16 optionally sets the status indicator 26 to set the context for executing the functions f(x) and/or g(x) at process block 145. The first layer 16 calls the function f'(x) of the second layer 18 at process block 150. The second layer 18 executes f'(x) by executing the service X and calling f(x) of the third layer 20 at process block 160. Upon execution of the function f(x), the third layer 20 checks the registration for callback routines 25 at process block 170. If a callback routine 25 is not registered at process block 170, the third layer executes the function f(x) as usual at process block 190.

If, however, the callback routine is registered at process block 170, the third layer 20 invokes the callback routine 25 of the first layer 16 at process block 180. The first layer executes the callback routine at process block 200 to check the context for executing the functions f(x) and/or g(x). The third layer 20 then executes the functions f(x) and/or g(x) based on the logic of the callback routine 25 at process block 210. The first layer 16 then returns to the third layer 20 at process block 220. The third layer 20 then returns to the second layer 18 at process block 230, and the second layer 18 returns the to the first layer 16 at process block 240. The second layer 18 does not notice any anomaly due to the different executions performed by the third layer 20. Yet, the first layer 16 benefits from the additional functionality of the third layer 20 without having to wait for modifications of the second layer 18. Thereafter, the method may end at process block 250.

As can be appreciated, the flowcharts and block diagrams in the FIGS illustrate the architecture, functionality, and operation of the possible implementations of systems, methods, and computer program products according to various embodiments of the present disclosure. In this regards, each block in the flowchart or block diagrams may represent a module, segment, or a portion of code which comprises one or more executable instructions for implementing the specified logical functions. It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts can be implemented by special purpose hardware-based systems that perform the specified functions or acts, or combinations of special purpose hardware and computer instructions.

As one example, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise process in a suitable manner, if necessary, and then stored in a computer memory. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While a preferred embodiment has been described, it will be understood that those skilled in the art, both now and in the future, may make various improvements and enhancements which fall within the scope of the claims which follow. These claims should be construed to maintain the proper protection for the disclosure first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed. The disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method, executed by a processor of a computer, of accessing layers in a multi-layer software architecture including a first layer, a second layer, and a third layer, the method comprising:
    at the third layer, publishing an interface by the processor;
    at the first layer, before execution of a first function, registering a callback routine with the third layer using the interface;
    calling the first function by the first layer;
    executing a second function by the second layer in response to the calling of the first function by the first layer, wherein executing the second function by the second layer calls a third function of the third layer;
    in response to the calling of the third function of the third layer, invoking the callback routine by the third layer;
    executing the callback routine by the first layer to set a context for executing the third function;
    executing the third function by the third layer based on the context;
    returning to the second layer by the third layer after executing the third function; and
    returning to the first layer by the second layer.

2. The method of claim 1 wherein the setting the context comprises setting a status indicator to set the context of execution, wherein the status indicator includes at least one of a global variable, a thread local variable, an instance variable, a mutex, a file, and a socket.

3. The method of claim 1, wherein the executing of the third function occurs before execution of the first function.

4. The method of claim 1, wherein the executing of the third function occurs after execution of the first function.

5. The method of claim 1, wherein the executing of the third function occurs, in parallel with execution of the first function.

6. The method of claim 1, wherein the executing of the third function occurs in place of executing the first function.

7. The method of claim 1, wherein the first layer comprises an application layer, wherein the second layer comprises an application server layer, and wherein the third layer comprises a database driver layer.

\* \* \* \* \*